United States Patent [19]

Sundermann et al.

[11] Patent Number: 4,764,107

[45] Date of Patent: Aug. 16, 1988

[54] SHAFT ARRANGEMENT FOR THERMAL AND/OR MATERIAL TRANSFER PROCESSES BETWEEN A GAS AND BULK MATERIAL

[75] Inventors: Erich Sundermann; Hanno Laurien; Wolfgang Vahlbrauk, all of Braunschweig; Hans Reye, Neustadt, all of Fed. Rep. of Germany

[73] Assignee: Perfluktiv-Consult AG, Basel, Switzerland

[21] Appl. No.: 62,346

[22] Filed: Jun. 11, 1987

Related U.S. Application Data

[63] Continuation of Ser. No. 810,283, filed as PCT EP85/00114, Mar. 16, 1985, published as WO85/04469, Oct. 10, 1985, abandoned.

[30] Foreign Application Priority Data

Mar. 24, 1984 [DE] Fed. Rep. of Germany ....... 3410894

[51] Int. Cl.[4] .............................................. F27D 1/08
[52] U.S. Cl. ...................................... 432/96; 432/99; 432/98; 432/101
[58] Field of Search .................................. 432/95-101

[56] References Cited

U.S. PATENT DOCUMENTS

| | | | |
|---|---|---|---|
| 1,533,572 | 4/1925 | Richards | 432/98 |
| 2,948,521 | 8/1960 | Heiligenstaedt | 432/101 |
| 2,996,292 | 8/1961 | Graf et al. | 432/99 |
| 3,955,915 | 5/1976 | Buchner | 432/96 |
| 4,334,859 | 6/1982 | Minegishi et al. | 432/99 |

FOREIGN PATENT DOCUMENTS

| | | |
|---|---|---|
| 31932 | 6/1885 | Fed. Rep. of Germany . |
| 328807 | 11/1920 | Fed. Rep. of Germany ........ 432/98 |
| 2707953 | 1/1921 | Fed. Rep. of Germany . |
| 607786 | 1/1935 | Fed. Rep. of Germany . |
| 618207 | 9/1935 | Fed. Rep. of Germany ........ 432/98 |
| 848172 | 9/1952 | Fed. Rep. of Germany . |
| 1243827 | 7/1967 | Fed. Rep. of Germany . |
| 1139777 | 7/1957 | France . |
| 1424099 | 11/1965 | France . |
| 157194 | 1/1921 | United Kingdom . |

*Primary Examiner*—Henry C. Yuen
*Attorney, Agent, or Firm*—Herbert Dubno; Andrew Wilford

[57] ABSTRACT

An apparatus for gas/solids exchange has a column having a plurality of vertically spaced grates on which the granular solids can form beds to be traversed by the gas. Each grate is provided in a grate plane by a plurality of fixed grate bars interdigitated with movable grate bars forming a planar unit which can be displaced by a controller out of the grate plane to allow the granular solids on the respective grate to trickle downwardly uniformly over the cross section of the column onto the next lower grate.

11 Claims, 6 Drawing Sheets

SHAFT ARRANGEMENT FOR THERMAL AND/OR MATERIAL TRANSFER PROCESSES BETWEEN A GAS AND BULK MATERIAL

This is a continuation of co-pending application Ser. No. 810,283 filed as PCT EP85/00114, Mar. 16, 1985, published as WO85/04469, Oct. 10, 1985 now abandoned.

CROSS REFERENCE TO RELATED APPLICATIONS

The application Ser. No. 810,283, filed on Nov. 22, 1985, now abandoned, also is a national phase application corresponding to PCT/EP85/00114 filed Mar. 16, 1985 and based in turn, upon the German national application No. P 34 10 894.7 filed Mar. 24, 1985 under the International Convention.

FIELD OF THE INVENTION

The invention relates to a shaft construction for thermal and/or material transfer procedures between a gas and a free flowing particulate bulk material having throughout a particle size of at least 6 mm, wherein the interior of the shaft is subdivided by intermediate trays into chambers for accommodating beds of the bulk material which fill the chambers only partly and comprising adjustable tray devices for the batch-wise conveyance of the beds through the shaft and wherein in the shaft walls passages are provided for passing the gas into at least some of the chambers into the free space above the respective bed.

Shaft constructions (DE-AS No. 11 65 477) are known for the expansion of porous aggregate materials comprising chambers one above the other accommodating the material crushed to the desired particle size, e.g. clay or oil shale, and being partly filled only, wherein the bottoms of the chambers are each formed by louvre slats which can be pivoted about their longitudinal axes. Passages for the introduction of fuel gases, in each case between the bed maintained in the respective chamber and the bottom thereabove are provided in the shaft walls. In order to avoid baking together of the material, the beds are subjected to mechanical loosening up by virtue of the bottoms of the chambers being driven so as to revolve and being equipped with downwardly directed teeth extending close to the next lower bottom.

The aforementioned shaft construction permits only a relatively low energy efficiency because the fuel gases can transmit their heat to the material being treated only by way of the respective bottoms of the chambers and the surfaces of the beds facing towards the interspaces. Moreover the provision of revolvable bottoms composed of louvre slats which are pivotable about their longitudinal axes involves considerable costs which are increased by the teeth connected to the bottoms and extending downwardly to the vicinity of the next bottom.

In order to improve the unfavourable and uneven heat transfer from the gases to the material particles of the bed in the abovementioned shaft construction, it is known (DE-AS No. 12 43 827) to provide combustion chambers on both sides of a shaft connected by way of throughput passages in the shaft walls to the shaft interior, the shaft interior in turn being subdivided into chambers by bottoms composed of revolvable flaps. An appropriate control of the revolvable flaps and a feeding means alternatingly screening off the two combustion chambers serves to alternatingly blow against the material as it drops from one chamber to the next and cause turbulent movement thereof with a view to more uniformly heating the individual material particles. In spite of the considerable costs for such a control means it is virtually impossible to heat the material uniformly because of the relative brevity of the period of transfer from one chamber to the next and because during the intervals between the periods of free fall of the material the latter is heated more strongly at the surface and in the region of the respective bottom of the chamber than in the interior of the bed.

The present invention provides a shaft construction as defined in the introduction, wherein above or in the upper part of the shaft a means is provided for feeding and uniformly distributing the premeasured material which will fill the chamber only partly over the cross section of the shaft on a grid forming the bottom of the uppermost chamber, the intermediate trays for forming the further chambers are similarly formed by grids and all grids are composed at least in part of movable grid rods comprising operating means and associated therewith at least one controllable drive means for the temporary enlargement, controlled as a function of time, of the gaps between adjoining grid rods by moving part of the grid rods out of the grid plane, and gas feed and discharge ducts associated with control means are connected to the passages in the shaft walls.

The above shaft construction is suitable for a variety of thermal and/or material transfer processes, for example the heating or cooling of particulate bulk material or of the gas, for the hardening, carburising, nitrogenation or tempering of metallic materials and for the upgrading and tempering of non-metallic organic materials, for the drying of amino silicate-containing granulates in preparation for a subsequent expansion process, for the deep-freezing of foodstuffs such as small size baked products or the like. The construction in addition is suitable for material transfer processes for the purpose of gas purification, e.g. by the adsorbtive binding of harmful components in waste gases.

In order to attain uniform transfer procedures in which all material particles of any one bed participate, it is important that the material particles at the individual levels each form beds of uniform bed thickness and are subjected to a uniform flow there around of gases or where appropriate of vapours introduced into the shaft interior due to the design of the bottoms of the chambers in the form of the above described grids, resulting in an intense turbulence of the gases or vapours in the interstices between the material particles maintained in the bed, whereby the material transfer process from the material particles to the gas or vice versa is improved.

Although shaft constructions for the burning of cement, lime, gipsum or the like are known (DE-PS 31 932) in which the shaft interior is subdivided by grids which are laterally withdrawable through the shaft walls in order to convey the material to be calcined level by level through the shaft, such shaft, because of the complete filling of the chambers with the bulk material does not permit a uniform flow through the material or a uniform transfer procedure between the gas and the bulk material particles, quite apart from the fact that a feeding of the bulk material, level by level, through the shaft interior is virtually impossible when the chambers are filled completely. An additional factor in the case of the aforesaid design of the shaft construction is that substantial problems due to bridging of the bulk material are virtually unavoidable.

A precondition for a uniform material or energy exchange includes not only the formation of beds of uniform bed thicknesses at the individual levels, but also that the formation of the bridging at the individual levels is counteracted or that any bridges which have formed are undone reliably before such bridges become permanent. Due to the above described design of the grids and the movability of the grid rods the aforesaid requirements can be met with exceptionally little construction effort. As a result of appropriate drive means controlled as a function of time for the movable grid rods used for the transfer of the beds from one level to the next, it is possible to create a uniform particle trickle across the entire cross section of the shaft and moreover due to the movable grid rods, in the course of each breaking up of the bed maintained on such grid rods, there is also attained a breaking up of any bridgings which may have formed. The desired trickle movement and breaking up of bridging formations may be provided either by a controlled lowering as a function of time or by a controlled lifting as a function of time of the movable grid rods, it being possible for the grid rods to be moved into two or three different planes depending on the nature of the material and the configuration of the material particles. The most advantageous pattern of movement of the grid rods may be determined for each case by appropriate prior trickle experiments.

The grids rods are advantageously so designed and constructed that the movable grid rods of each grid due to their ends being connected form at least one structural unit which is movable out of the plane of the stationary grid rods by virtue of the operating means and the controllable drive means. In this context the above described transferring of the movable grid rods due to their being combined into two structural units per grid also permits their movement into two or three planes in order to ensure as a function of the configuration and size of the bulk material particles as well as of the grid rods that the beds are transferred from one level to the next such that the uniform bed thickness over the entire shaft cross section is ensured.

Further details concerning the construction and operation of the grid rods or of the structural units formed by the grid rods will be apparent from the subsidiary claims in which also a variety of possibilities of designing the shaft from annular closed modular units, each comprising a grid and at least in part passages through the walls for the feeding and discharging of the gases as well as the designs of the grids as structural units which can be moved sideways through closable window apertures in the shaft walls are described.

In order to avoid reliably a blocking of the gaps between the grid rods by bed material particles special measures have to be taken. For this purpose the invention provides that the grid rods viewed in cross section in their upper region comprise a waist formation and are fitted with interchangeable rider-shaped profile members which are slidably fitted thereto and which are advantageously horse-shoe-shaped, comprising projections directed in the longitudinal direction of the grid rods serving as stop members in respect of adjoining profile members.

The use of the aforesaid rider-shaped profile members of different dimensions on the rods associated with a grid may simultaneously serve to control the flow of the gas passing through the bed, since the rider-shaped profile members so fitted may be used to influence the free cross section between the adjoining grid rods.

In order to avoid the above described possible bridge formations and to attain loosening up or partial reconstruction of the material particles of a bed, it may be advantageous to provide below the grid of one or other chamber a grid-like insert for the formation of parallel flow passages and to arrange flaps pivotal about horizontal axes in the flow passages which are pivotal into the longitudinal direction of the shaft or normal thereto alternatingly or in groups in a pattern analogous to the squares of a chessboard. In order to allow the flaps to be operated in groups, it is advantageous to provide for each row of flaps two horizontal axes one above the other for the alternating movements of the flaps.

Finally, it is advantageous for separating beds or groups of beds from adjoining groups, for example if groups of beds maintained in a shaft are to be subjected to a flow therethrough of different gases if for the purpose of such partitioning between two adjoining grids a partition is provided composed of pivotal louvre slats which by their adjustment can be moved into a closed or open position.

Instead of the aforedescribed shaft construction comprising the grid rods which are adapted in part to be moved out of the grid plane, the shaft construction as set out in the introductory paragraph may also be of a design, comprising above or in the upper portion of the shaft a means for feeding and uniformly distributing over the shaft cross section a measured amount of material which fills each of the chambers only partly onto a grid constituting the bottom of the uppermost chamber and the intermediate trays for forming the further chambers are similarly composed of grids and such grids are composed of parallel stationary carrying rods above which are provided slats which are inclined in relation to one another in a roof-shaped pattern and which transversely to their longitudinal direction comprise slot-shaped passages alternating slats being stationary, whilst the others are mounted pivotally above the carrying rods, all pivotally held slats of a grid being connected to a controllable pivoting drive. This constitutes a further aspect of the present invention either as such or in combination with various of the features described further above.

The drawing illustrates diagrammatically a working example of the invention.

There is shown in.

Figure 1:
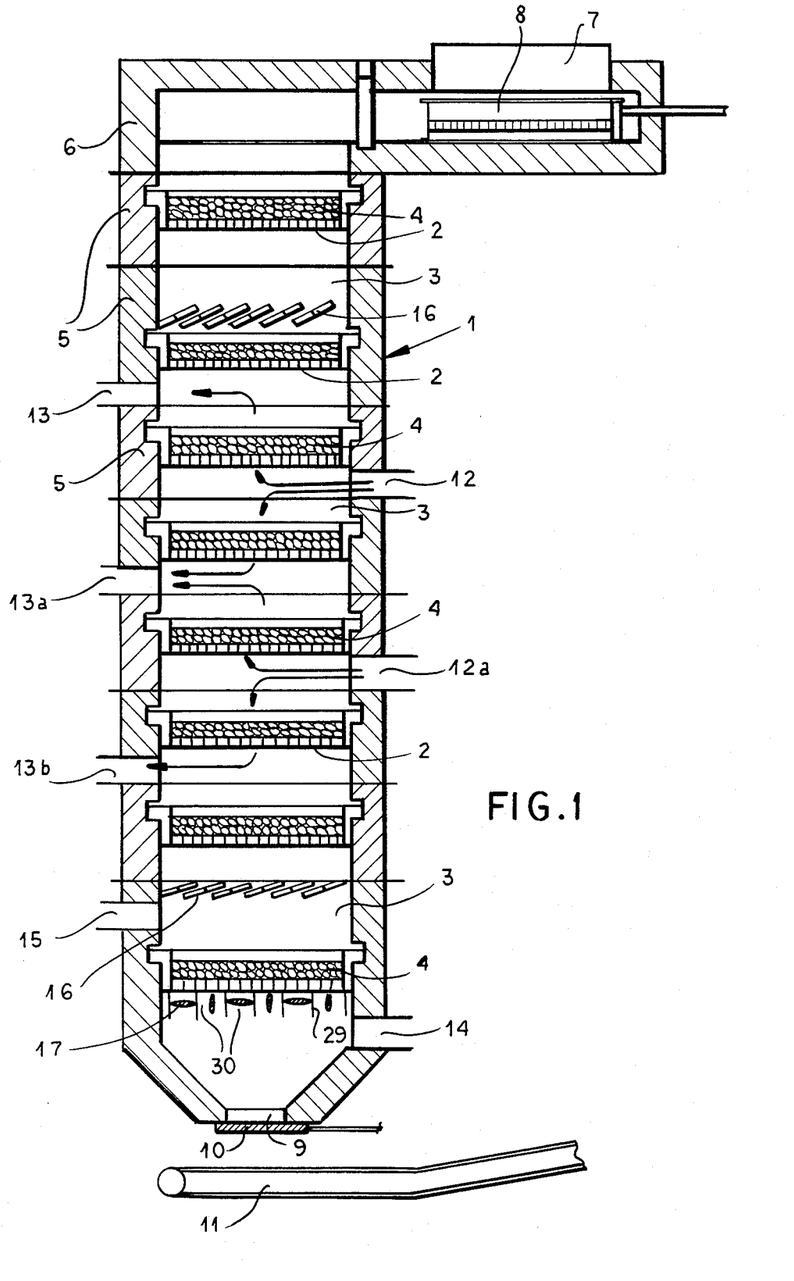
FIG. 1, a longitudinal section through a shaft according to the invention including different treatment zones for the material, FIG. 2a, on a larger scale part of the section according to FIG. 1 at the level of a grid from which details of the grid design are apparent, FIG. 2b, a plan view onto the embodiment according to FIG. 2a, FIGS. 3a, and 3b, possible positions of the grid rods when arranged and designed in accordance with FIGS. 2a and 2b, FIG. 4, a perspective view of two grid rods with part of the rider-shaped profile members applied thereto, FIG. 5, a partial plan view of grid rods according to FIG. 4 with rider-shaped profile members applied thereto, FIG. 6, a partial longitudinal section through the shaft according to FIG. 1 in the region of the lowermost level, FIG. 7, a reversed plan view against the flaps according to FIG. 6 distributed over the shaft cross section, FIG. 8, an enlarged view of a cross section through one of the flaps according to FIGS. 6 and 7, FIG. 9, a partial longitudinal section through a shaft having laterally insertable grids.

The shaft illustrated in FIG. 1 comprises a shaft wall, the whole of which is denoted as 1 and is of square or rectangular cross section. In the shaft grids or grates 2 are fitted in the walls 1 spaced apart one above the other such that between successive grids chambers 3 are formed which are only partially filled by planar beds 4 of particulate or granulated or lumpy material to be treated, such that between the top surface of the bed 4 and the grid 2 there above a free interspace remains.

In the illustrated example the shaft is assembled from closed annular module members 5 fitted one above the other, each having held therein a grid 2, such that the shaft can be manufactured from an appropriate number of module members 5 in varying heights and with accordingly variable numbers of levels. At its lower end the shaft comprises a discharge aperture 9 closable by a slider 10, for discharging the material treated in the shaft. Below the shaft a conveyor 11 for the onward conveyance to further treatment of processing of the material emerging from the shaft may be seen.

In an upward direction the shaft is closed by a closure casing 6 designed in the form of an inlet lock or gate. In the laterally projecting part of the closure casing 6 a metering device 7, illustrated diagrammatically, is provided in which the particular amount of material required for a bed 4 is accommodated and from there is transmitted into a slidable mould box 8, forming a flat bed having a uniform bed thickness over its cross section, this mould box being downwardly closed by a grid corresponding to the grid 2 in the module members 5 of the shaft 1 and fitted with the same operating devices not shown in the drawing as are the grid 2 in the shaft so that at least part of the grid rods may be moved out of the grid plane as will be described in the context of the further grids 2 provided in the shaft further below. The bed contained in the mould box 8 is transferred into the uppermost chamber 3a of the shaft or onto the grid forming the bottom limit of that chamber.

In the walls 1 of the shaft feed or discharge apertures 12, 12a, 13, 13a and 13b as well as 14 and 15 are provided leading into the chambers 3 or into the free interspaces formed between the chambers and which are connected to appropriate gas feed or discharge ducts which are not illustrated in the drawings and which in turn lead to conveying means or devices for the treatment of the gases or where appropriate of vapours, depending on what gases or vapours are to be used for treating the material maintained in the beds 4.

In the illustrated shaft according to FIG. 1 a partition is provided between the two uppermost beds 2 or respectively between the two uppermost chambers 3 formed of pivotal louvre slats and adapted to be moved into the closed and open positions by adjustment of the slats. A similar partition composed of louvre slats 16 is provided between the lowermost chamber in the chamber immediately there above. Finally, a grid-shaped insert 29 is to be seen underneath the lowermost grid 2 of the shaft serving for the formation of parallel flow passages 30 and in which flaps 17 are provided which are pivotal about horizontal axes 27, 28 and some of which occupy a closed position, whilst others occupy an open position.

Figure 2A:
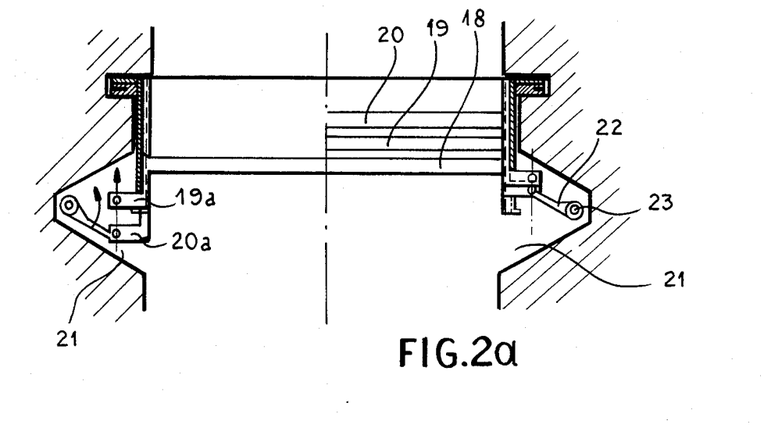
Figure 2B:
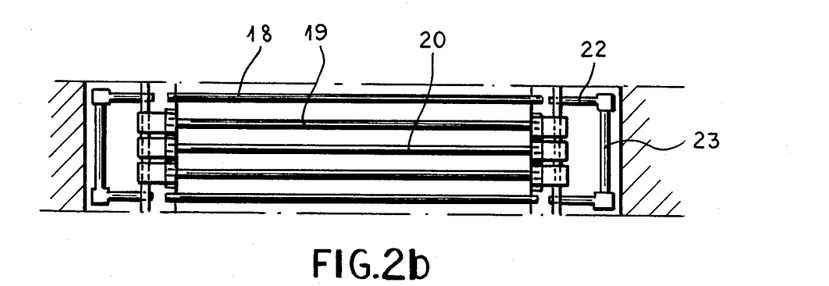

The grids 2 provided in the shaft according to FIGS. 2a and 2b are each formed in part by stationary grid rods 18 and in part by movable grid rods 19 and 20, the latter being movable upwardly from the plane of the grid in relation to the stationary grid rods 18 in order to temporarily increase the free intervals between adjoining grid rods.

In FIG. 2a in the left hand part thereof, the position of the grid rods 18 to 20 in the grid plane is shown, whilst in the right hand part the grid rods 19 and 20 have been illustrated raised to different positions in relation to the grid plane. For raising the grid rods 19 and 20, crank or pivot arms 22 are provided in nook-shaped rebates 21 on the inside of the shaft wall 1 and adapted to be pivoted from the outside by way of an operating shaft 23. The movable grid rods 19 and 20 are longitudinally extended in relation to the fixed grid rods 18 and are combined in each case in a raisable or lowerable structural unit, the extensions of the grid rods 19 and 20 according to FIG. 2a comprising crank arms 19a and 20a respectively of different lengths. The result is that, due to a pivoting movement of the crank arms 22 about the pivoting axis 23, the grid rods 19 and 20 are moved to different levels as can be seen in the right hand half of FIG. 2a.

Figure 3A:
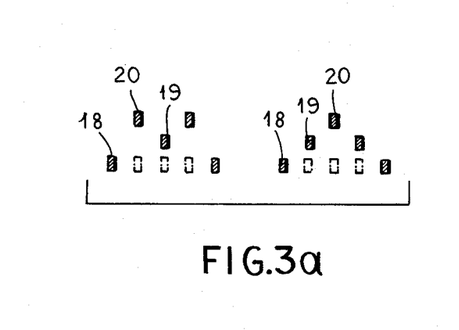
Figure 3B:
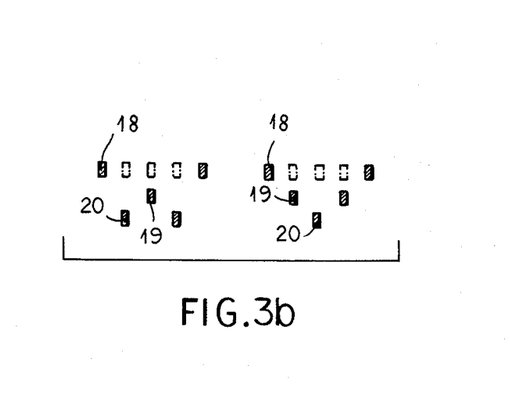

Instead of the movable grid rods 19 and 20 to be adapted to be raised, it is vice versa possible for the lowering of these grid rods to be provided for, such that as a function of such raising or lowering movement of the grid rods 19 and 20 the relative positionings of the grid rod in relation to one another may be changed as illustrated for example in FIGS. 3a and 3b.

Figure 4:
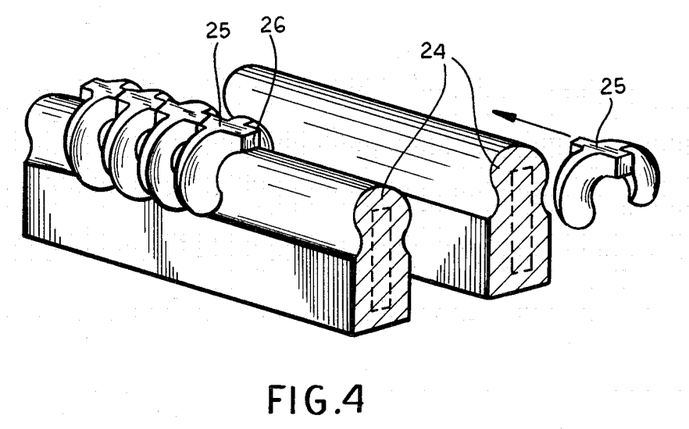
Figure 5:
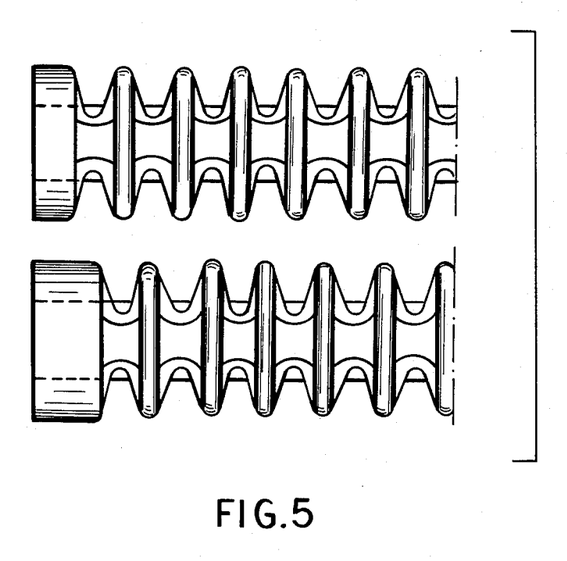
Figure 6:
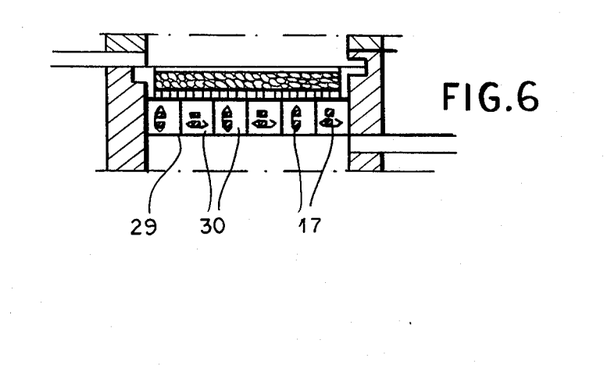
Figure 7:
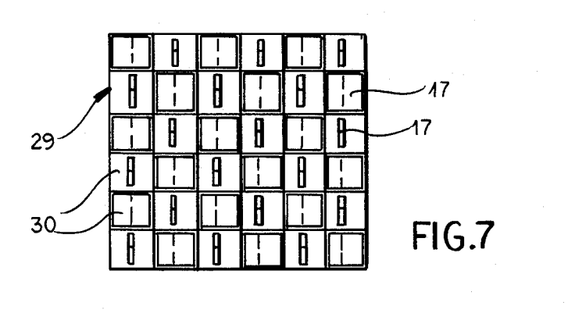
Figure 8:
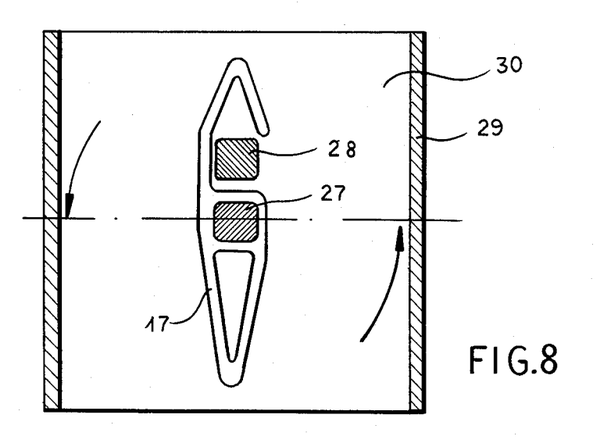

The grid rods diagrammatically illustrated in FIGS. 2a and 2b in practice advantageously have the configuration illustrated in FIGS. 4 and 5. It will be seen that the grid rods which may be in the form of solid or hollow profiled rods, viewed in cross section, in their upper region have a waist formation 24 and are fitted with slidably applied rider-shaped profile members 25 which are slid onto the grid rods. The rider-shaped profile members are of horse-shoe configuration and comprise projections 26 directed in the longitudinal direction of the grid rods serving as stop members or adjoining rider-shaped profile members. When the rider-shaped profile members are densely packed onto the grid rods, there results a configuration of the grid rods as apparent in plan view for two adjoining grid rods in FIG. 5.

The rider-shaped profile members 25 have the effect that the lowermost layer of material in any one bed is prevented from blocking the gaps between adjoining grid rods even if the material is composed of cylindrical particles where, without the profile members 25, the material particles due to rolling movement are likely to enter into alignment in the gaps between the grid rods. The rider-shaped profile members, for any given spacing of the grid rods may have different diameters such that the percentage proportion of free cross sectional areas through the grids 2 may be adjusted correspondingly or may be varied overall or in places. It is moreover possible by using rider-shaped profile members 25 of different cross sections to influence the local flow conditions through the bed.

The shaft illustrated in FIG. 1 may for example serve for heating or even for cooling of the material to be treated. For that purpose the passages 12 and 12a may for example jointly be connected to a blower, whilst the passages 13, 13a and 13b in their turn are connected to a common gas discharge duct, which may for example form part of a circuit and which may, e.g. by way of a heat exchanger be in turn connected to the blower. The bed 4 which is lowermost in the shaft may be subjected to feeding of a gas which is different or of different temperature and the discharge thereof or alternatively to a gas circuit through the feed and discharge apertures 14 and 15 respectively. In this context a partial flow through this bed may be brought about in the aforesaid lowermost bed by virtue of the grid-shaped insert device 29 in conjunction with the flaps 17, and by setting up appropriate flow velocities therethrough, the expansion point for the material maintained in the bed may be attained or exceeded such that in the region of the passages 30 through which gas flows, a partial movement of the material particles takes place whereby these are loosened up and moved by the flow into the regions of the squares which are not subjected to gas flow. By changing the positioning of the flaps 17 a return and reversed movement of the material particles may be attained. This mode of operation is particularly advantageous if during the gas passages through the lowermost bed the material particles are inclined to cake together. The provision of the louvre slats 16 above the lowermost bed provides a separate treatment zone for the lowermost bed. In this context the bed above the lowermost slats 16 provides an additional blocking layer through which no treatment gas flows. By way of contrast, in the illustrated example, the next following four beds viewed in the upward direction, when the passages 12 and 12a are connected to a gas feedline are subjected to a flow in the direction of the illustrated arrows partly from above downwards and partly from below upwards, and the treatment gas is discharged through the outlet apertures 13, 13a and 13b. The aforesaid outlet apertures may be connected to a common gas discharge duct. By suitable control means the flow direction of the gas can be reversed easily in opposition to the illustrated arrows, such that changing the flow direction during the periods of residence of the beds in the individual levels is easily possible.

The second bed from above in the illustrated shaft according to FIG. 1 once again forms a blocking layer since above this bed a further partition formed by pivotal louvre slats 16 is provided, maintained in the closed position during the flow through the beds. This bed is is always formed during that period during which the remaining beds are subjected to flow in the described manner.

Once the bed which is lowermost in the shaft has due to the flow therethrough attained its desired final state, the movable grid rods of this grid are transferred into the open position so that the bed is broken up and whilst the slider 10 is open, is transferred to the conveyor 11. After the movable grid rods have been returned into the plane of the stationary grid rods, the pivotal louvre slats 16 above this grid are swung into the open position and by a controlled operation as a function of time of the grid rods of the bed above the slats, the bed maintained thereon is broken up in the manner described above and is transferred in the form of a trickle flow in freefall across the entire cross section onto the lowermost grid such that a uniform bed thickness across the shaft is attained. This procedure is now repeated from one grid to the next until the uppermost grid in the shaft is free of material. Whilst the louvre slats 16 in the uppermost part of the shaft are in the closed position, the material for the formation of the uppermost bed is then transferred into the shaft by means of the slidable mould box 18.

For operating the movable grid rods drive means of various types, e.g. hydraulic, electric or electric-mechanical drive means with appropriate control means may be used in order to modify both the stroke height as well as the pattern of movement in time of the up and down movements.

When operating the shaft according to FIG. 1 in the described manner, it is possible depending on the nature of the material and of the gases to provide a drying or heating or cooling of the material and/or a chemical treatment of the material when using appropriate gases or vapours.

When operating the shaft using gases of relatively high temperatures up to 1350° C. a suitable material for the grid rods and for the remaining load-bearing parts of the grid as well as for a grid-shaped insert, when provided and the flaps and axes therein mounted composed of sisic was found suitable or of the action sintered Sic for even higher temperatures of up to 1600° C.

FIGS. 6 to 9 show details regarding the provision and construction of flaps 17 which are pivotable about their horizontal axes, provided within the flow passages 30 of the grid-like insert device 29. The flaps 17 are held in the flow passages in a pattern analogous to the squares of a chessboard, such that adjoining flaps occupy respectively different positions. In order to be able to jointly adjust those flaps 17 of any one row which occupy the same positions, two horizontal axes 27 and 28 are provided one above the other in accordance with FIG. 8 on which the flaps 17 of each row are mounted alternatingly. In the working example according to FIG. 8 the flaps 17 mounted on the axis 27 provide a rebate accommodating the axes 28 of the respectively adjoining flaps without this axis 28 interfering with the pivoting movement of the flaps mounted on the axis 27. In this manner it is possible to transfer all flaps into the closed position or all flaps into the open position or alternatively, to move the adjoining flaps into different positions.

Figure 9:
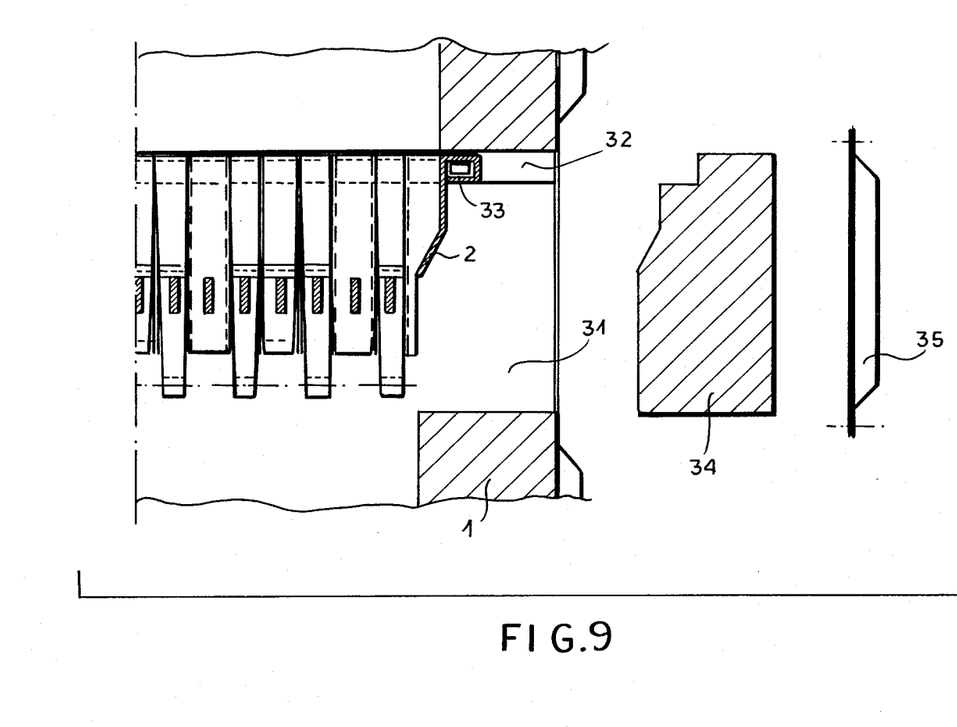

Instead of the modular construction of the shaft according to FIG. 1, the shaft wall 1 may take the form of a continuous shaft wall and comprise window apertures 31 in accordance with the example of FIG. 9, through which the grids may be inserted laterally in the form of the aforementioned structural units. In this context the grids which are composed in the above described manner of stationary and movable grid rods are held in groove-shaped rebates 32 of the lateral shaft walls by way of a carrier means 33. For closing the window aperture 21 in the shaft wall a matching filler member 34 is used in conjunction with a cover plate 35 which is screwed onto the shaft wall 1 after the filler member has been inserted. Due to this construction, it is possible at relatively low cost to change the grids in the form of structural units at short notice.

Figure 10:
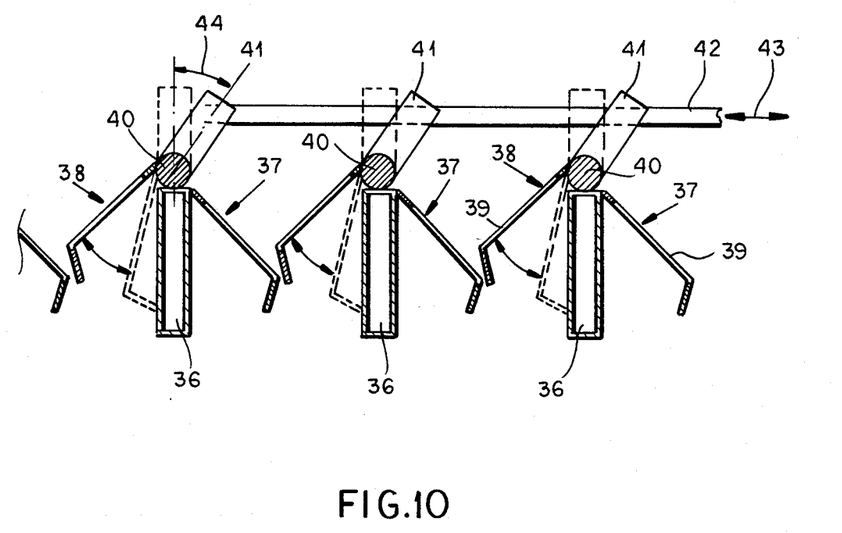
FIG. 10, a diagrammatic sectional view similar to FIG. 2a through a grid construction which differs from that in accordance with FIGS. 2 to 9.

Instead of the grids illustrated in FIGS. 2 to 9 comprising grid rods which can be moved out of the grid plane, it is possible for the grids to be constructed as illustrated in FIG. 10, comprising parallel carrier rods 36 in a stationary frame-shaped carrier means similar to the carrier means 33 in FIG. 9. In that case the carrier rods 36 may take the form of hollow rods. Above each carrier rod 36 slats 37 and 38 are provided which are so orientated in relation to one another as to form a roof-shaped configuration and which transversely to their longitudinal directions comprise slot-shaped passages 39. In this context each alternating slat 37 is rigidly attached to the carrier rod 36, for example by welding, whilst each other slat 38 is fixed to a pivoting axis 40 provided above the carrier rod. The pivoting axis in this context are mounted in the frame-shaped carrier device and are connected to pivoting arms 41 projecting outside of the grid surface, and which in their turn are linked to a pushrod 42 connected to a pivoting drive such that they are movable back and forth in the direction of the double arrow 43 and in this manner the pivoting arms 41 can be swung in the direction of the double arrow 44. In this manner the pivotable slats 38 can be moved from their position shown in solid lines into the position shown in broken lines and thus perform a similar task as was described in the context of the raisable and lowerable grid rods 19 and 20 of FIGS. 2 to 9.

The grid construction according to FIG. 10 may similarly be produced in the form of premanufactured units and be connected to an appropriate crank drive for pivoting the slats 38 and be installed in the shaft by a modular construction method.

It will be apparent from the aforegoing that the present teachings, judiciously and skilfully applied can be used to provide a shaft construction of the type defined in the introduction so designed that a uniform thermal and/or material transfer between the gas and the bulk material is attained which results in appreciable energy savings and a reduction of the number of chambers required and thereby in a lower overall height of the shaft.

The claims which follow are to be considered an integral part of the present disclosure. Reference numbers (directed to the drawings) shown in the claims serve to facilitate the understanding of the claims, but are not intended to restrict in any way the language of the claims to what is shown in the drawings, unless the contrary is clearly apparent from the context.

We claim:

1. An apparatus for heat exchange between a gas and a flowable solid having a given minimum particle size of at least about 6 mm, the apparatus comprising:
   a shaft having walls;
   a plurality of grates vetically spaced in said shaft and defining with the walls of said shaft respective chambers above each grate and delimited by the next higher grate, each of said grates including:
   an array of mutually parallel horizontal fixed grate bars defining a respective grate plane,
   a plurality of mutually parallel horizontal jointly movable grate bars interleaved between the respective fixed grate bars,
   means supporting said movable grate bars to enable them to be shifted vertically and jointly out of the respective plane, each bar of each grate being spaced by at most the minimum particle size from the immediately adjacent bars when in the plane, and
   control means connected to said movable grate bars for shifting them vertically out of said plane and thereby leaving the bars in the respective plane spaced by more than the minimum particle size to permit uniform cascade of said flowable solid over the cross section of said shaft and onto a next lower grate, and back into said plane to receive a cascade of said flowable solid from a grate thereabove and form a new layer of the solid on the bars of the grate in the respective plane;
   metering means communicating with the shaft at the top thereof for depositing a quantity of said flowable solid on an uppermost one of said grates which is sufficient to form said layers upon transfer of said quantity from grate to grate downward along said shaft but which is insufficient to fill said chambers, whereby a free space remains above each layer and the next higher grate in each chamber;
   means forming inlets opening into respective ones of said free spaces for delivering said gas through said walls of at least some of said chambers; and
   means forming outlets communicating with respective others of said free spaces through said walls of others of said chambers between the chambers to which said gas is delivered for discharging gas so that said gas vertically traverses said layers and said grates carrying same in passing from the chambers to which said gas is delivered into chambers from which said gas is discharged, at least some of the movable grate bars of each grate being connected together at their ends to form a coplanar unit shiftable out of the respective grate plane by the respective control means, said coplanar units each being constructed and arranged to be lifted from the respective grate plane by the respective control means and returned to the respective grate plane.

2. The apparatus defined in claim 1 wherein a plurality of said units is provided for each of said grates, each of said units of each grate being positionable in a plane different from the plane of the respective grate and from the planes of the other units of the respective grate upon shifting of the movable grate bars right of the respective grate plane to permit said uniform cascade of said flowable solid over the cross-section of said shaft onto a next lower grate.

3. The apparatus defined in claim 1 wherein each of said bars is a hollow bar.

4. The apparatus defined in claim 1 wherein said grate bars of each grate are joined in structural units adapted to be inserted into said shaft through lateral openings therein.

5. The apparatus defined in claim 1 wherein said grate bars of each grate are joined in structural units adapted to be inserted into said shaft through lateral openings therein.

6. The apparatus defined in claim 1 further comprising recesses formed in said walls at opposite ends of said grate bars for each grate to accommodate said control means.

7. The apparatus defined in claim 1 wherein said grate bars have upper portions formed with altering bulges and constrictions along the length of each grate bar.

8. The apparatus defined in claim 1 further comprising louver means below at least one of said grates and having slats displaceable between open and closed positions for controlling gas flow.

9. The apparatus defined in claim 1 wherein the bars are all substantially identical and form a uniform array when coplanar.

10. An apparatus for effecting exchange between a gas and a flowable solid having a particle size of at least 6 mm, comprising:
    a shaft;
    a plurality of grates vertically spaced in said shaft and defining with walls of said shaft respective chambers above each grate and delimited by the next higher grate, each of said grates including:

an array of mutually parallel horizontal fixed grate bars defining a respective grate plane, a plurality of mutually parallel horizontal movable grate bars disposed between said fixed grate bars, means mounting said movable grate bars to enable them to be shifted out of said plane, and control means connected to said movable grate bars for shifting them out of said plane to permit uniform cascade of said flowable solid over the cross section of said shaft onto a next lower grate, and back into said plane to receive a cascade of said flowable solid from a grate thereabove and from a new layer of the solid on the bars of the grate in the respective plane;

metering means communicating with the shaft at the top thereof for depositing a quantity of said flowable solid on an uppermost one of said grates which is sufficient to form said layers upon transfer of said quantity from grate to grate downwardly along said shaft but is insufficient to fill said chambers, whereby a free space remains above each layer and the next higher grate in each chamber;

means forming inlets opening into respective ones of said free spaces for delivering said gas in said walls of at least some of said chambers; and means forming outlets communicating with respective others of said free spaces in said walls of others of said chambers between the chambers to which said gas is delivered, for discharging gas so that said gas traverses said layers and said grates carrying same in passing from the chambers to which said gas is delivered into chambers from which said gas is discharged, said grate bars having upper portions formed with altering bulges and constrictions along the length of each grate bar, said bulges being riders mounted on a ridge of the respective grate bar connected with a body thereof by a narrow waste.

11. The apparatus defined in claim 10 wherein each of said riders has a projection extending in the longitudinal direction of the respective grate bar for abutment with an adjacent rider whereby said bulges are uniformly spaced along each grate bar.

* * * * *